United States Patent
Cao et al.

(10) Patent No.: US 10,728,865 B1
(45) Date of Patent: Jul. 28, 2020

(54) MULTI-ANTENNA COHERENT COMBINING FOR CARRIER SENSING AND SYMBOL TIMING

(71) Applicant: NXP USA, INC., Austin, TX (US)

(72) Inventors: Rui Cao, Fremont, CA (US); Xiayu Zheng, San Jose, CA (US); Hongyuan Zhang, Fremont, CA (US)

(73) Assignee: NXP USA, INC., Austin, TX (US)

( * ) Notice: Subject to any disclaimer, the term of this patent is extended or adjusted under 35 U.S.C. 154(b) by 538 days.

(21) Appl. No.: 15/371,109

(22) Filed: Dec. 6, 2016

Related U.S. Application Data

(60) Provisional application No. 62/265,243, filed on Dec. 9, 2015.

(51) Int. Cl.
| | |
|---|---|
| *H04J 3/06* | (2006.01) |
| *H04W 56/00* | (2009.01) |
| *H04B 7/08* | (2006.01) |
| *H04L 5/00* | (2006.01) |
| *H04W 84/12* | (2009.01) |

(52) U.S. Cl.
CPC .......... *H04W 56/0005* (2013.01); *H04B 7/08* (2013.01); *H04L 5/0048* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,983,311 B2 * | 7/2011 | Hosokawa | ............ | H04L 7/042 370/465 |
| 8,442,141 B1 * | 5/2013 | Zhang | ................. | H04B 7/0417 370/334 |
| 8,995,587 B1 * | 3/2015 | Zhang | ................. | H04B 7/0417 370/334 |

(Continued)

OTHER PUBLICATIONS

IEEE P802.11ac/D4.0, "Draft Standard for Information Technology—Telecommunications and information exchange between systems—Local and metropolitan area networks—Specific Requirements; Part 11: Wireless LAN Medium Access Control (MAC) and Physical Layer (PHY) specifications; Amendment 4: Enhancements for Very High Throughput for Operation in Bands below 6 GHz", Oct. 2012, 408 pages.

(Continued)

*Primary Examiner* — Willie J Daniel, Jr.

(57) ABSTRACT

The present disclosure includes systems and techniques relating to multi-antenna coherent combining (MACC) for carrier sensing (CS) and symbol timing (ST) in a wireless communication system. In some implementations, a device includes a receiver and processor electronics. The receiver is configured to receive two or more signals from two or more antennas, each of the two or more signals including a known, periodic reference signal that has gone through a respective wireless channel via one of the two or more antennas. The processor electronics are configured to obtain estimated phases of the two or more signals from the two or more antennas; obtain a combined signal by combining the two or more signals with coherent estimated phases of the two or more signals; and perform carrier sensing and symbol timing of the two or more signals based on the combined signal.

20 Claims, 8 Drawing Sheets

(56) References Cited

U.S. PATENT DOCUMENTS

| | | | |
|---|---|---|---|
| 9,019,991 B1 * | 4/2015 | Zhang | H04L 29/02 370/330 |
| 9,398,615 B1 * | 7/2016 | Zhang | H04L 27/2278 |
| 9,888,496 B1 * | 2/2018 | Zheng | H04W 74/0808 |

OTHER PUBLICATIONS

Gunnam et al., "Multi-Rate Layered Decoder Architecture for Block LDPC Codes of the IEEE 802.11n Wireless Standard", IEEE, pp. 1645-1648, 2007.

* cited by examiner

MULTI-ANTENNA COHERENT COMBINING FOR CARRIER SENSING AND SYMBOL TIMING

CROSS REFERENCE TO RELATED APPLICATIONS

This application claims the benefit of the priority of U.S. Provisional Application Ser. No. 62/265,243, filed on Dec. 9, 2015 and entitled "Multi-antenna Coherent Combining for Carrier Sensing and Symbol Timing," which is hereby incorporated by reference in its entirety.

BACKGROUND

The present disclosure describes systems and techniques relating to carrier sensing (CS) and symbol timing (ST) in a wireless communication system.

Wireless local area networks (WLANs, e.g., WiFi networks) typically include an access point (AP) and one or more client stations. WLANs have evolved rapidly over the past decade. Development of WLAN standards such as the Institute for Electrical and Electronics Engineers (IEEE) 802.1a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Further standards promise to provide even greater throughputs, such as throughputs in the tens of Gbps range.

SUMMARY

The present disclosure includes systems and techniques relating to multi-antenna coherent combining (MACC) for carrier sensing (CS) and symbol timing (ST) in a wireless communication system. According to an aspect of the described systems and techniques, a device includes a receiver and processor electronics. The receiver is configured to receive two or more signals from two or more antennas, each of the two or more signals including a known, periodic reference signal that has gone through a respective wireless channel via one of the two or more antennas. The processor electronics configured to obtain estimated phases of the two or more signals from the two or more antennas; obtain a combined signal by combining the two or more signals from the two or more antennas with coherent estimated phases of the two or more signals from two or more antennas; and perform carrier sensing and symbol timing of the two or more signals from the two or more antennas based on the combined signal to detect the periodic reference signal in the two or more signals received by the receiver.

According to another aspect of the described systems and techniques, a method includes receiving, by a receiving device, two or more signals from two or more antennas, each of the two or more signals including a known, periodic reference signal that has gone through a respective wireless channel via one of the two or more antennas; obtaining, by the receiving device, estimated phases of the two or more signals from the two or more antennas; obtaining, by the receiving device, a combined signal by combining the two or more signals from the two or more antennas with coherent estimated phases of the two or more signals from two or more antennas; and performing, by the receiving device, carrier sensing and symbol timing of the two or more signals from the two or more antennas based on the combined signal to detect the periodic reference signal in the two or more signals received by the receiving device.

According to another aspect of the described systems and techniques, a non-transitory computer-readable medium embodies a program operable to cause a receiving device to perform operations including receiving two or more signals from two or more antennas, each of the two or more signals including a known, periodic reference signal that has gone through a respective wireless channel via one of the two or more antennas; obtaining estimated phases of the two or more signals from the two or more antennas; obtaining a combined signal by combining the two or more signals from the two or more antennas with coherent estimated phases of the two or more signals from two or more antennas; and performing carrier sensing and symbol timing of the two or more signals from the two or more antennas based on the combined signal to detect the periodic reference signal in the two or more signals received by the receiving device.

The foregoing and other implementations can each optionally include one or more of the following features, alone or in combination. For example, in some implementations, the known, periodic reference signal is transmitted as a short training field (STF) sequence in a beginning part of a preamble for wireless local area network (WLAN) communication.

In some implementations, for each of the two or more signals from the two or more antennas, perform a cross-correlation of the signal from the antenna with the known, periodic reference signal is performed; and based on the cross-correlation, the wireless channel is estimated for the signal from the antenna.

In some implementations, a time-domain average of the cross-correlation is obtained, and wherein estimating the wireless channel based on the cross-correlation includes estimating the wireless channel based on the time-domain average of the cross-correlation.

In some implementations, both a phase difference and a delay offset are estimated based on the estimated wireless channel for the each of the two or more signals from the two or more antennas; and wherein combining the two or more signals from the two or more antennas with coherent phases based on the estimated phases of the two or more signals from the two or more antennas includes combining the two or more signals from the two or more antennas with coherent phases according to both the phase difference and the delay offset.

In some implementations, phase differences are estimated based on the estimated wireless channel for the each of the two or more signals from the two or more antennas; and wherein combining the two or more signals from the two or more antennas with coherent phases based on the estimated phases of the two or more signals from the two or more antennas includes combining the two or more signals from the two or more antennas with coherent phases according to the phase differences.

In some implementations, a reference received signal is identified from the two or more signals from the two or more antennas; and for each of the two or more signals from the two or more antennas, other than the reference received signal, perform a cross-correlation of the signal with the reference received signal is performed; and based on the cross-correlation, a phase difference between the signal and the reference received signal is estimated.

In some implementations, the phase difference between the signal and the reference received signal is estimated based on a quantized angle of analog to digital converter (ADC) samples of the signal.

In some implementations, for the each of the two or more signals, other than the reference received signal, a time-domain angle average of an angle difference between the signal and the reference received signal is obtained; a rounded time-domain average of the angle difference is obtained by performing an angle rounding of the time-domain angle average of the angle difference; and a phase mapping of the rounded time-domain angle average of the angle difference is performed, wherein the phase difference between the signal and the reference received signal is estimated based on the phase mapping of the rounded time-domain angle average of the angle difference. In some implementations, the time-domain angle average of the angle difference is obtained by using a low-pass filter.

In some implementations, for the each of the two or more signals, other than the reference received signal, a corresponding phase difference of an angle difference between the signal and the reference received signal is obtained by a phase mapping; a time-domain phase average of the corresponding phase difference is obtained; and a quantized time-domain phase average of the corresponding phase difference is obtained, wherein the phase difference between the signal and the reference received signal is estimated based on the quantized time-domain phase average of the corresponding phase difference. In some implementations, the time-domain phase average of the corresponding phase difference is obtained by using a low-pass filter.

In some implementations, an amplitude of the time-domain phase average of the corresponding phase difference is scaled when the amplitude of the time-domain phase average of the corresponding phase difference is below a threshold.

In some implementations, in response to receiving a signal indicating a phase jump of one of the two or more signals or detecting a phase jump of one of the two or more signals, an estimated phase of the one of the two or more signals is reset to a previously determined value.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The disclosed technologies can result in one or more of the following potential advantages. The described systems and techniques can provide more robust carrier sensing and more accurate symbol timing detection. In some implementations, the described systems and techniques can result in less hardware cost, less computational complexity, and shorter latency.

Details of one or more implementations are set forth in the accompanying drawings and the description below. Other features and advantages may be apparent from the description and drawings, and from the claims.

DRAWING DESCRIPTIONS

DETAILED DESCRIPTION

Figure 1:
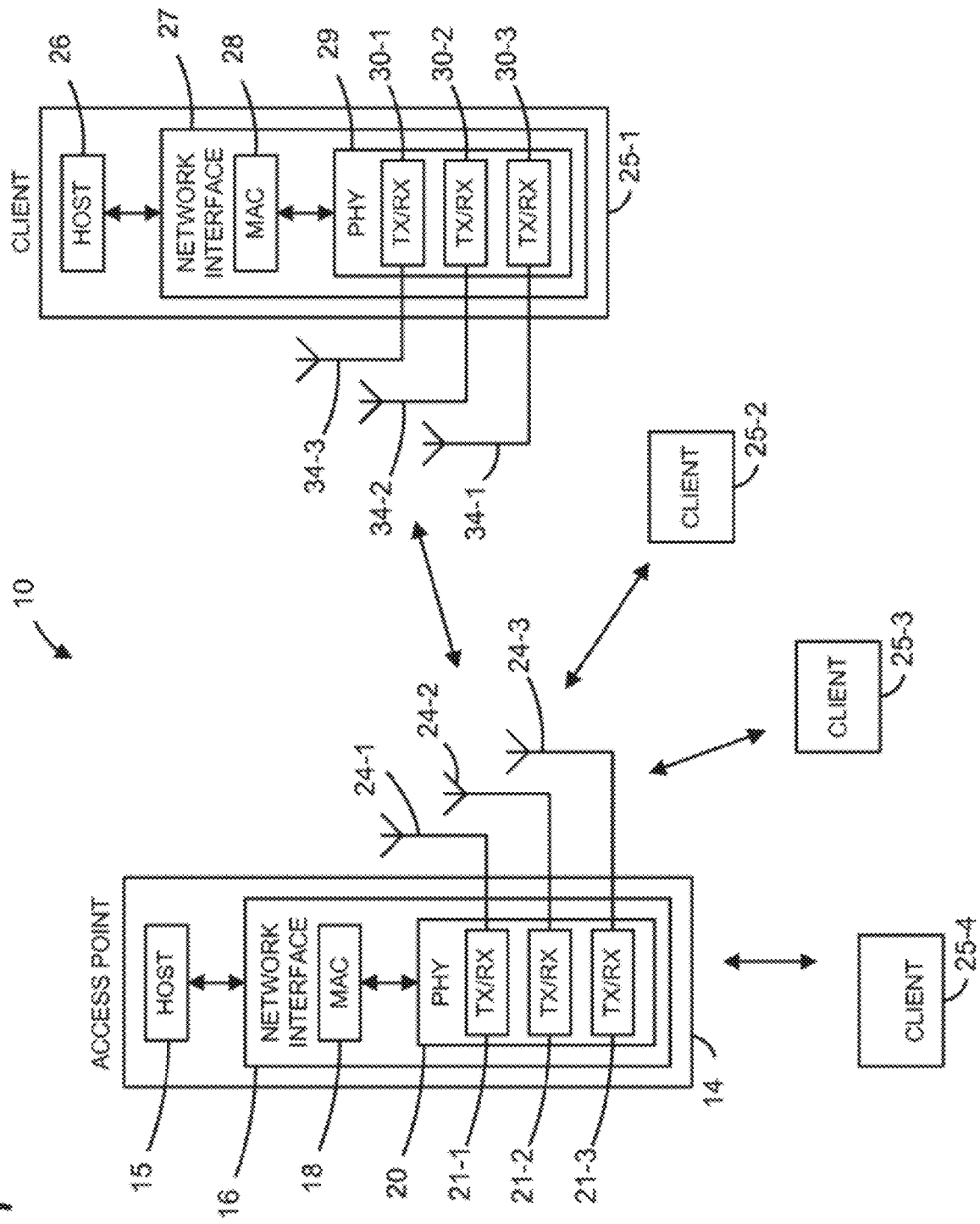
FIG. 1 is a block diagram showing an example of a wireless communication system.

The systems and techniques described herein can be implemented as one or more devices, such as one or more integrated circuit (IC) devices, in a communication device (e.g., a wireless communication device, a wireline communication device, an electronic data storage device, a channel medium access access/control device). For example, the systems and techniques disclosed can be implemented in a wireless local area network (WLAN) transceiver device (e.g., a WLAN chipset) suitable for use in an orthogonal frequency division multiplexing (OFDM) multiple input multiple output (MIMO) system.

In WLAN systems, the first part of a preamble of each packet (e.g., an OFDM packet, also referred to as a data unit) is a short training field (STF). The STF includes periodic signals. For example, a legacy STF (LSTF, STF in legacy WLAN protocols such as IEEE 802.11 a/b/g/n) includes 10 repetitions of a 0.8 us sequence. Carrier sensing (CS) and symbol timing (ST) are typically conducted based on the STF sequences. For example, a receiver performs CS to detect if there is a WiFi signal, and performs ST is to detect frame or packet timing (e.g., the start or end time) of the OFDM packet.

In IEEE 802.11n and 802.11ac, a multi-antenna design is adopted into WiFi systems. Data detection performance can be improved by taking advantage of the multiple antennas, especially at low signal to noise ratio (SNR). The system performance will be limited by the CS/ST if signals from the multiple antennas are not coherently combined. In this disclosure, multi-antenna coherent combining (MACC) techniques are described to improve the CS/ST performance in a multi-input-multi-output (MIMO) setup.

For MACC, samples of received signals from multiple antennas with coherent weights are combined into one sample stream, which can improve the received signal SNR. Theoretically, for a Gaussian channel $h_i$ on antenna i, the optimal coherent combining weight is the conjugate of the channel (i.e., $h_i^*$). In practical systems, the channel information is unknown at the point of CS/ST. In addition, due to the automatic gain control (AGC) effect, an analog-to-digital convertor (ADC) needs a settling time to provide a stable, reliable ADC amplitude gain. As such, at the CS/ST stage, the ADC amplitudes for the first few received ADC samples may not be reliable.

To perform CS/ST, autocorrelation is typically performed on two consecutive sequences (e.g., within the STF sequence) to detect the start of an OFDM packet. In some implementations, correlation needs to be oblivious of gain change, for example, because of the AGC effect. In some implementations, instead of an ADC sample correlation, an angle autocorrelator is utilized. For example, the phase or angle of each ADC sample is extracted and quantized. The phase or angle is sent to the autocorrelator for CS/ST. For MACC in a MIMO system, the signals from different antennas can be combined with coherent phases to provide suboptimal combining SNR gain. Several examples of techniques for estimating coherent combining phase for CS/ST are described in this disclosure.

FIG. 1 is a block diagram showing an example of a communication system, such as a WLAN system 10. The WLAN system 10 includes an access point (AP) 14 and multiple clients 25-1, 25-2, 25-3 and 25-4 (collectively, clients 25). The AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21-1, 21-2, 21-3 (collectively, transceivers 21), and the transceivers 21 are coupled to a plurality of antennas 24. Although three transceivers 21 and three antennas 24-1, 24-2, and 24-3 (collectively, antennas 24) are illustrated in FIG. 1, the AP 14 includes other suitable numbers (e.g., 1, 2, 4, 5, etc.) of transceivers 21 and antennas 24 in other embodiments. In some embodiments, the MAC processing unit 18 and the PHY processing unit 20 are configured to operate according to a first communication protocol (e.g., IEEE 802.11n). In some embodiments, the MAC processing unit 18 and the PHY processing unit 20 are also configured to operate according to a second communication protocol (e.g., IEEE 802.11ac). In further embodiments, the MAC processing unit 18 and the PHY processing unit 20 are additionally configured to operate according to the second communication protocol, a third communication protocol and/or a fourth communication protocol (e.g., the IEEE 802.11a, 802.11b, and/or 802.11g).

The WLAN 10 includes a plurality of client stations 25. The client stations 25 can include access terminals (AT), wireless stations (STAs), mobile stations (MS), or other devices. Although four client stations 25 are illustrated in FIG. 1, the WLAN 10 includes other suitable numbers (e.g., 1, 2, 3, 5, 6, etc.) of client stations 25 in various scenarios and embodiments. The client stations 25 (e.g., client station 25-1) can be configured to operate according to a communication protocol that supports MIMO communications (e.g., IEEE 802.11n or IEEE 802.11ac). In some instances, a client station 25 can be configured to operate according to another communication protocol (e.g., IEEE 802.11a, 802.11b, and/or 802.11g).

The client station 25-1 includes a host processor 26 coupled to a network interface device 27. The network interface device 27 includes a MAC processing unit 28 and a PHY processing unit 29. The PHY processing unit 29 includes a plurality of transceivers 30-1, 30-2, and 30-3 (collectively, transceivers 30), and the transceivers 30 are coupled to one or more antennas 34-1, 34-2, and 34-3 (collectively, antennas 34). Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

In some implementations, the PHY processing unit 20 of the AP 14 is configured to generate data units conforming to a communication protocol and having corresponding formats. For example, the data units include a preamble that includes a short training field (STF) in a beginning part of the preamble. The PHY processing unit 20 of the AP 14 can use a known, periodic reference sequence (also known as pilot or training sequence) as the STF sequence of the data units. The transceiver(s) 21 is/are configured to transmit the generated data units via the antenna(s) 24. Similarly, the transceiver(s) 21 is/are configured to receive the data units via the antenna(s) 24. The PHY processing unit 20 of the AP 14 is configured to process received data units conforming to the communication protocol and having corresponding formats and to determine that such data units conform to the communication protocol, according to various embodiments.

In some implementations, the PHY processing unit 29 of the client device 25-1 is configured to generate data units conforming to the communication protocol and having corresponding formats. For example, the data units include a preamble that includes an STF in a beginning part of the preamble. The PHY processing unit 29 of the client device 25-1 can use a known, periodic reference sequence as the STF sequence of the data units. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the communication protocol and having corresponding formats and to determine that such data units conform to the communication protocol, according to various embodiments.

Figure 2:
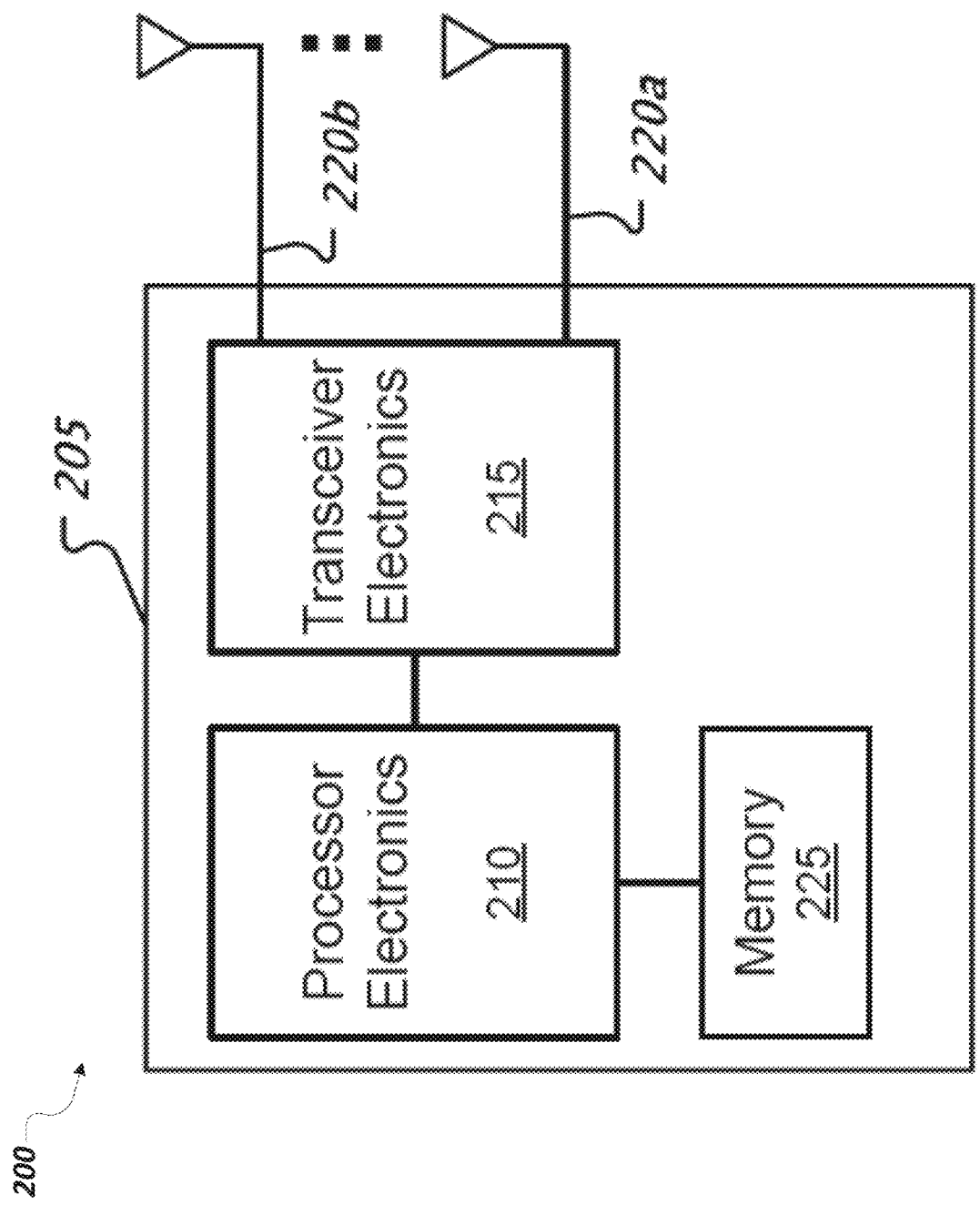
FIG. 2 shows a simplified block diagram of an example of a wireless communication device.

FIG. 2 shows a simplified block diagram 200 of an example of a wireless communication device 205. Various examples of device 205 include an access point (AP), a base station (BS), an access terminal (AT), a client station, or a mobile station (MS). For example, the device 205 can represent one or more of the AP 14 or client stations 25 in FIG. 1 or another device.

The device 205 can include processor electronics 210 such as one or more processors that implement methods effecting the techniques presented in this disclosure. The processor electronics 210 can be operable to execute computer-readable instructions that, when executed on the processor electronics 210, cause the device 205 to implement methods effecting the techniques presented in this disclosure. For example, the processor electronics 210 can cause the device 205 to perform MACC for CS/ST.

The device 205 can include transceiver electronics 215 (e.g., a transmitter, receiver, or transceiver) to send and/or receive wireless signals over one or more antennas 220a-

220b. In some implementations, transceiver electronics 215 can include multiple radio units. In some implementations, a radio unit includes a baseband unit (BBU) and a radio frequency unit (RFU) to transmit and receive signals. In some implementations, the device 205 includes dedicated circuitry for transmitting (e.g., a dedicated transmitter) and dedicated circuitry for receiving (e.g., a dedicated receiver). For example, transceiver electronics 215 can include one or more receivers that receive one or more signals from one or more antennas 220a-220b, transmitted over one or more WLAN channels.

The device 205 can include one or more memories 225 configured to store information such as data and/or instructions (e.g., computer-readable instructions that cause the device 205 to implement methods effecting the techniques presented in this disclosure).

Figure 3:
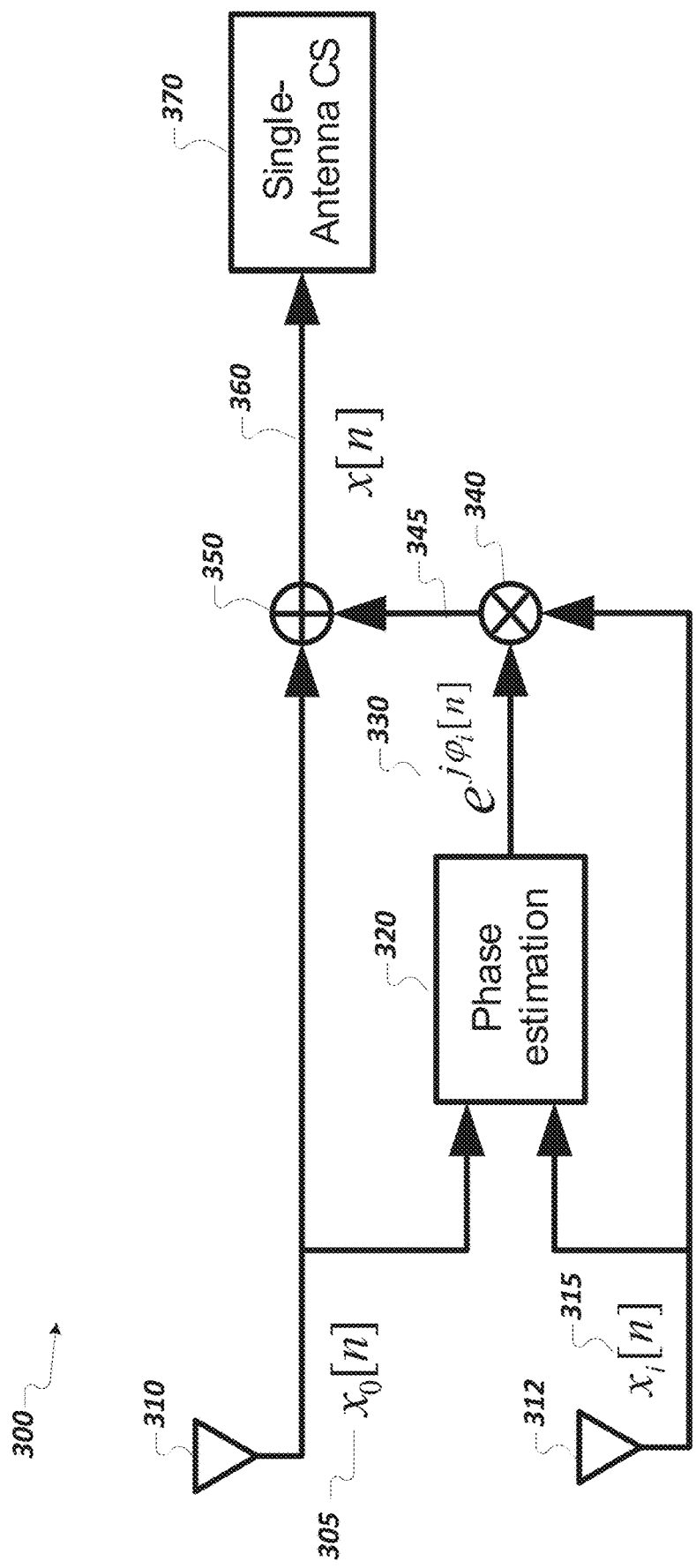
FIG. 3 is a diagram of an example of a receiving device for performing multi-antenna coherent combining (MACC) for carrier sensing (CS) and symbol timing (ST).

FIG. 3 is a diagram of an example of a receiving device 300 for performing MACC for CS/ST. The device 300 includes, among other things, at least a pair of antennas 310 and 312, a phase estimator 320, and a single-antenna CS processing unit 370. In general, for a multiple-antenna system, a receiving device can include $N_R \geq 2$ receiving antennas. In some implementations, a coherent combining phase of a signal received from each of the $N_R$ receiving antennas can be estimated. In some other implementations, one of the $N_R$ receiving antennas can be identified as a reference antenna r, and a phase difference of a signal received from each of the rest ($N_R-1$) receiving antennas relative to that of the reference antenna r can be estimated.

In some implementations, a reference antenna r can be selected, for example, blindly as antenna 0 or chosen as the one with the strongest received signal energy. For example, as illustrated in FIG. 3, the antenna 310 is identified as the reference antenna. For each of the rest $N_R-1$ receiving antennas, say, antenna i, i=1, 2, . . . , $N_R-1$, a phase difference of a signal received from the antenna i relative to a signal received from the reference antenna r (also referred to as a reference received signal) can be estimated.

Specifically, the device 300 receives two signals $x_0$ [n] 305 and $x_i$ [n] 315 from the antenna r 310 and antenna i 312, respectively. The signals $x_0$ [n] 305 and $x_i$ [n] 315 can be the STF sequences that include multiple repetitions of a known reference sequence that have gone through respective wireless channels via the respective two antennas 310 and 312. In some implementations, the signals $x_0$ [n] 305 and $x_i$ [n] 315 represent analog-to-digital converter (ADC) samples of the received signal streams, respectively.

The phase estimator 320 performs coherent combining phase estimation of the input signals $x_0$ [n] 305 and $x_i$ [n] 315. In some implementations, the phase estimator 320 outputs an estimated phase difference $e^{j\varphi_i[n]}$ 330 of the signal $x_i[n]$ 315 relative to the reference received signal $x_0$ [n] 305. The estimated phase difference $e^{j\varphi_i[n]}$ 330 is multiplied with the signal $x_1$ [n] 315 by a multiplier 340, resulting a phase-adjusted or phase-compensated signal $e^{j\varphi_i[n]}x_i$ [n] 345. The phase-adjusted signal 345 and the reference received signal $x_0$ [n] 305 are summed together by an adder 350, resulting in a combined signal x[n] 360 with coherent combining phase. The combined signal x[n] 360 can be regarded as a single-antenna signal and input into the single-antenna CS processing unit 370 for CS/ST.

Figure 4:
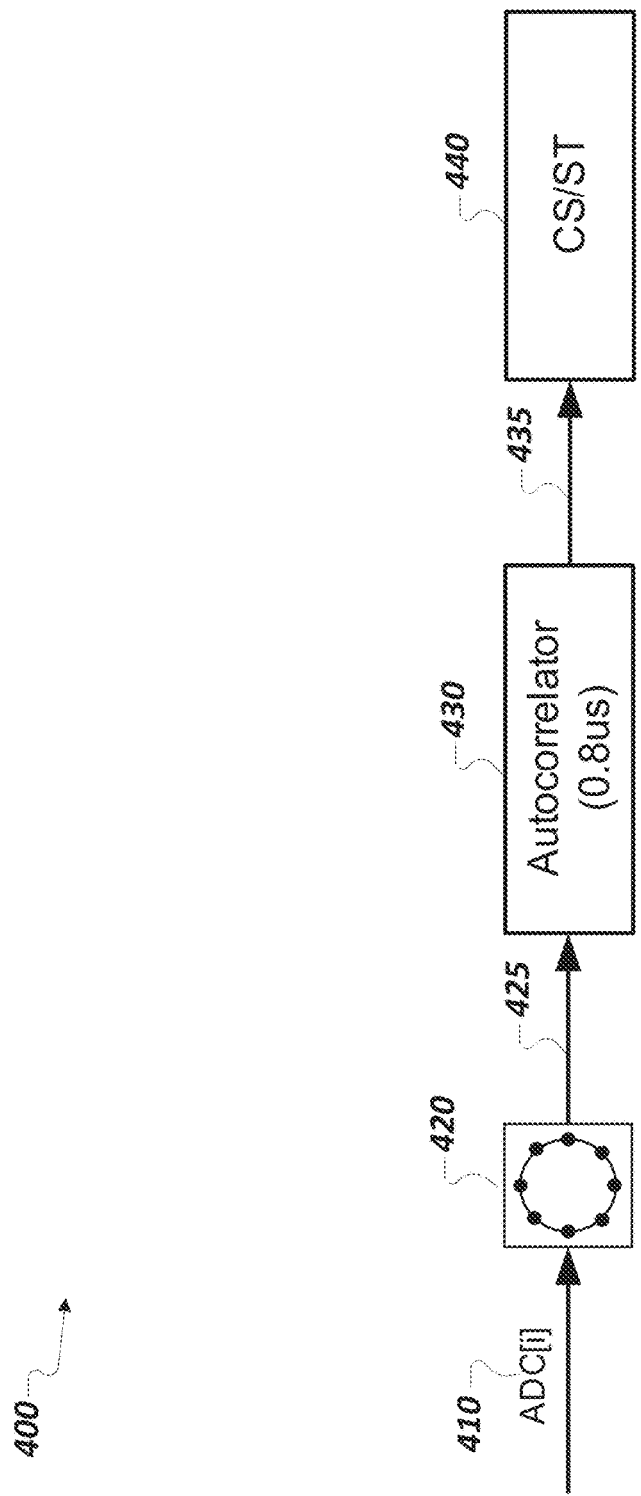
FIG. 4 is a diagram of an example of a correlation path for performing CS/ST.

FIG. 4 is a diagram of an example of correlation path 400 for performing for CS/ST. The correlation path 400 includes, among other things, a quantizer 420, an autocorrelator 430, and a CS/ST processing unit 440. The angle correlation path 400 receives ADC samples and returns CS/ST detection results (e.g., whether there is WiFi signal and where the received OFDM packet starts). The correlation path 400 can be used as for CS/ST for single- or multiple-antenna systems. For example, the correlation path 400 can be used as the single-antenna CS processing unit 370 of the device 300 in FIG. 3.

In some implementations, the phase or angle of each ADC sample, ADC[i] 410, is extracted and quantized, by the quantizer 420. The ADC sample, ADC[i] 410, can be the ADC sample $x_0$ [n] 305 or $x_i$ [n] 315 for instance. The quantized phase or angle 425 is input into the autocorrelator 430 for computing correlations of the received sequence. As an example, the autocorrelator 430 can compute the correlation of a sequence of ADC samples ADC[i] 410 with the known reference sequence (e.g., the 0.8 us sequence) transmitted in the STF of the OFDM packet. The correlation output 435 is input into the CS/ST processing unit 440 for CS/ST. For example, the value of the correlation output 435 is used to determine whether there is WiFi signal, based on whether the correlation value is beyond or below a threshold. The locations of the peak and dip values of correlation output 435 can be used to detect the starting and/or ending time of the OFDM packet.

Several techniques can be used for coherent phase estimation for MACC, for example, based on STF sequences to perform CS/ST. As a first example, an STF cross-correlation method includes performing cross-correlation of the received signal stream from each antenna with the known sequence of one STF period, for example, according to Equation (1):

$$Corr_i[n] = \sum_{k=0}^{N_{STF}-1} x_i[n-k] \cdot s^*[k], \quad (1)$$

where $x_i$ [k] represents the kth ADC sample of the received signal stream $x_i$ from antenna i, s[k] represents the kth sample of the known sequence s of one STF period (e.g., the 0.8 us sequence), $Corr_i[n]$ represents the cross-correlation of the received signal stream $x_i$ with the known sequence s at a delay or offset n, and $N_{STF}$ represents the total number of samples in the known sequence of one STF period.

When AGC gain roughly settles, the correlation output for one period length (e.g., 0.8 us) can be considered the estimated channel $h_i$ associated with the antenna i. In some instances, the estimated channel $h_i$ includes multiple channel taps or paths $h_i[n]$ at different delay instances n. In other words, the computed cross-correlation $Corr_i[n]$ according to Equation (1) can be regarded as the estimated channel tap $h_i[n]$:

$$h_i[n] = Corr_i[n] \quad (2).$$

In some implementations, the correlation $Corr_i[n]$ can be updated and averaged every STF period (e.g., 0.8 us) to improve the estimation accuracy. Various averaging methods can be used to obtain a refined angle cross-correlation and improve the estimation accuracy of the channel. Examples of the averaging methods include using a low-pass filter, such as, a one-pole filter or a windowed filter for averaging.

In some implementations, both a combining phase and a delay offset of the channel can be estimated. For example, in the cases of channels with a large delay spread and/or wide antenna spacing, the peak gain of the estimated channel may not be the same for all antennas. In some implementations, a reference antenna r can be chosen, for example, blindly as antenna 0 or chosen as the one with the strongest received signal energy. Signals from different antennas can be combined according to the strongest path offset $\Delta_i$ and phase difference $\varphi_i$ relative to those of the reference antenna r, for example, according to Equation (3):

$$x[k] = x_r[k] + \sum_{i=0, i \neq r}^{N_R-1} x_i[k - \Delta_i] \cdot e^{j\phi_i} \qquad (3)$$

where x[k] represents the kth sample of the combined signal from $N_R$ receiving antennas, $x_r[k]$ represents the kth ADC sample of the reference received signal stream $x_r$ from the reference antenna r, and $x_i[k]$ represents the kth ADC sample of the received signal stream $x_i$ from antenna i. The strongest tap or path of a channel $h_i$ is the channel tap or path that has the maximum amplitude $\max(|h_i[k]|)$ among all $N_{h_i}$ channel taps of the channel $h_i$. The delay of the strongest tap or path of a channel $h_i$ is given by $$\max_k(|h_i[k]|),$$

where $k \in 0, 1, \ldots, N_{h_i}$. Thus, the offset $\Delta_i$ of the strongest path of channel $h_i$ relative to that of the reference channel $h_r$ (i.e., the channel corresponding to the reference antenna r) is given by:

$$\Delta_i = \max_k(|h_i[k]|) - \max_k(|h_r[k]|). \qquad (4)$$

The angle difference $\phi_i$ between the strongest path of the channel $h_i$ relative to that of the reference channel $h_r$ is estimated, for example, according to Equation (5):

$$\phi_i = \angle(h_i[\max_k] \cdot h_r^*[\max_k]) \qquad (5).$$

The phase difference corresponding to the angle difference $\phi_i$ is $e^{j\phi_i}$.

In some implementations, only the coherent combining phase but not the delay offsets is estimated. In this case, signals from all antennas are added with the same alignment without different delay offsets, for example, according to Equation (6):

$$x[k] = x_r[k] + \sum_{i=0, i \neq r}^{N_R-1} x_i[k] \cdot e^{j\phi_i}. \qquad (6)$$

The angle difference $\phi_i$ between the channel $h_i$ relative to the reference channel $h_r$ is estimated, for example, according to Equation (7):

$$\phi_i = \angle \left( \sum_{k=0}^{N_h} h_i[k] h_r^*[k] \right), \qquad (7)$$

where $N_h$ is the number of taps that is used to compute the estimate of the angle difference. For example, $N_h$ can be the number of strong taps in the channel estimates h. The phase difference corresponding to the angle difference $\phi_i$ is $e^{j\phi_i}$.

In some instances, due to AGC gain changes of the practical systems, the combining phase estimation based on the amplitudes of the ADC samples may not be ideal. As another example, the coherent combining phases can be estimated based on quantized angles from the ADC samples. As this approach does not need to rely on the AGC settling timing signal, it can be more reliable and computationally efficient.

For example, an inter-antenna cross-correlation method can be used to estimate the coherent phases. The inter-antenna cross-correlation can be computed based on the quantized angles from the ADC samples. For example, the inter-antenna cross-correlation method includes performing a cross-correlation of the received signal stream from each antenna with the received signal from the reference antenna r. The reference antenna r can be chosen arbitrarily or based on energy or other criteria. For example, a coherent angle $\phi_i$ corresponding to the received signal stream $x_i$ from antenna i can be estimated based on the cross-correlation of the received signal stream $x_i$ from antenna i with the received reference signal $x_r[k]$ from the reference antenna r according to Equation (8):

$$\phi_i = \angle \left[ \sum_{k=0}^{n} x_i^*[k] \cdot x_r[k] \right]. \qquad (8)$$

where n represents the number of ADC samples that are used for cross-antenna phase estimation.

The combined signal x[k] from $N_R$ receiving antennas can be obtained, for example, according to Equation (9) based on the estimated coherent angle $\phi_i$:

$$x[k] = x_r[k] + \sum_{i=0, i \neq r}^{N_R-1} x_i[k] \cdot e^{j\phi_i}. \qquad (9)$$

In this example, the coherent combining phase (or angle) is estimated from samples correlation (e.g., based on $x_i[k]$ and $x_r[k]$). To improve the phase estimation, several averaging methods can be implemented.

One option includes the angle average. Various averaging methods can be adopted to obtain the angle average. Examples of the averaging methods include using a low-pass filter, such as, a one-pole filter or a windowed filter, according to Equations (10) and (11), respectively:

$$\bar{\phi}_i[n] = (1-\beta)\bar{\phi}_i[n-1] + *\beta \cdot \angle(x_i[n] \cdot x_0[n]) \qquad (10),$$

where $0 < \beta < 1$ is a weighting parameter, and $$\bar{\phi}_i[n] = \angle \left[ \sum_{k=n-N+1}^{n} x_i^*[k] \cdot x_0[k] \right] \qquad (11)$$

where N is the window size used for obtaining the windowed average.

Another option includes the phase average. Various averaging methods can be adopted to obtain the phase average. Examples of the averaging methods include using a low-pass filter, such as, a one-pole filter or a windowed filter, according to Equations (12) and (13), respectively:

$$e^{j\bar{\phi}_i[n]} = (1-\beta)e^{j\bar{\phi}_i[n-1]} + \beta \cdot e^{j\angle(x_i^*[n] \cdot x_0[n])}, \qquad (12)$$

$$e^{j\overline{d_i}[n]} = \sum_{k=n-N+1}^{n} e^{jL(x_i^*[k] \cdot x_0[k])}. \quad (13)$$

Figure 5:
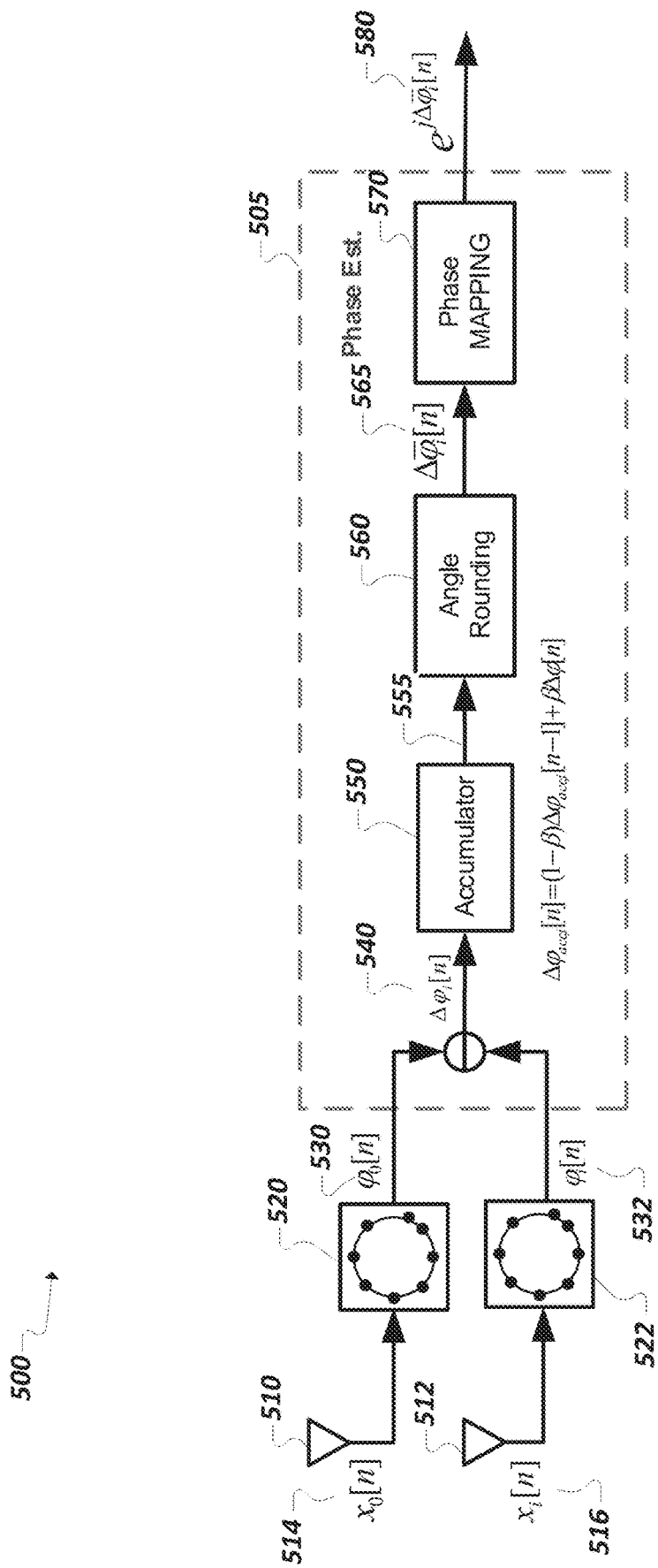
FIG. 5 is a diagram of a receiving device that includes an example of a phase estimator for coherent phase estimation based on an angle average approach.

FIG. 5 is a diagram of a receiving device 500 that includes an example of a phase estimator 505 for coherent phase estimation based on an angle average approach. Besides the phase estimator 505, the device 500 includes, among other things, a pair of antennas 510 and 512 and a pair of quantizers 520 and 522. The device 500 receives two signals $x_0$ [n] 514 and $x_i$ [n] 516 from the two antennas 510 and 512, respectively. The signals $x_0$ [n] 514 and $x_i$ [n] 516 can be the STF sequences that include multiple repetitions of a known reference sequence that have gone through respective wireless channels via the respective two antennas 510 and 512. In some implementations, the signals $x_0$ [n] 514 and $x_i$ [n] 516 can represent ADC samples of the received signal streams.

The quantizers 520 and 522 quantize the angles of the signals $x_0$ [n] 514 and $x_i$ [n] 516 and output the quantized angles $\varphi_0$ [n] 530 and $\varphi_i$ [n] 532, respectively. The quantizers 520 and 522 can quantize the angles, for example, according to a phase shift keying (PSK) constellation or another mapping. The granularity of the quantization can be determined based on, for example, a desired estimation accuracy, response time requirement, computational complexity or other criteria.

In some implementations, the phase estimation can be performed by estimating a phase difference between the two received signals $x_0$ [n] 514 and $x_i$ [n] 516. For example, the signal $x_0$ [n] 514 can be regarded as a reference received signal. The phase estimator 505 receives the quantized angles $\varphi_0$ [n] 530 and $\varphi_i$ [n] 532 and derives an angle difference $\Delta\varphi_i[n] = \varphi_i[n] - \varphi_0[n]$ 540 of the received signal $x_i$ [n] 516 relative to the reference received signal $x_0$ [n] 514. After estimation, the phase estimator 505 outputs an estimated phase difference $e^{j\Delta\overline{\varphi}[n]}$ 580, which is used for combining the signals $x_0$ [n] 514 and $x_i$ [n] 516 with coherent phases, for example, according to Equation (9).

The phase estimator 505 performs coherent combining phase estimation based on an angle average approach. In some implementations, the phase estimator 505 includes an accumulator 550, an angle rounder 560, and a PSK mapper 570. The accumulator 550 accumulates and averages the angle difference $\Delta\varphi_i[n] = \varphi_i[n] - \varphi_0$ [n] 540 of the received signals over time (e.g., across the sample index n). For example, the accumulator 550 performs a one-pole filter averaging of the angle difference according to Equation (14):

$$\Delta\varphi_{acc,i}[n] = (1-\beta)\Delta\varphi_{acc,i}[n-1] + \beta \cdot ([\varphi_0[n] - \varphi_i[n]]) \quad (14),$$

where $\Delta\varphi_{acc,i}[n]$ 555 represents the accumulated angle average for antenna i at the time instance n. In some implementations, the angle difference $\Delta\varphi_i[n] = \varphi_i[n] - \varphi_0$ [n] is moduloed to the range [-PSK_Points/2, PSK_Points/2). That is, the angle difference is moduloed to the range of [-π, π).

The accumulated angle average $\Delta\varphi_{acc,i}[n]$ 555 is then fed into the angle rounder 560 to bring the $\Delta\varphi_{acc,i}[n]$ into an integer number, for example, according to Equation (15):

$$\Delta\overline{\varphi_i}[n] = [\text{round}(\Delta\varphi_{acc,i}[n])] \quad (15).$$

In some implementations, another modulo operation is performed after rounding to bring the value of $\Delta\overline{\varphi_i}[n]$ to the range of [0, 2π). The resulting angle estimate $\Delta\overline{\varphi_i}[n]$ 565 is input into a phase mapper 570 to obtain a corresponding combining phase $e^{j\Delta\overline{\varphi}[n]}$ 580 based on the angle estimate $\Delta\overline{\varphi_i}[n]$ 565. The phase mapper receives an input angle and returns a phase according to a mapping rule. In some implementations, the phase mapper 570 can be, for example, a PSK mapper that maps an angle to a phase of a PSK point according to a PSK constellation. For instance, the phase mapper 570 may be a binary PSK (BPSK) mapper such that any input angle within the range of [-90°, 90°) is mapped to a phase of $e^{j0} = 1$; whereas any input angle within the range of [90, -90°) is mapped to a phase of $e^{j\pi} = -1$. The selection of the phase mapper can depend on, for example, a desired estimation accuracy, response time requirement, computational complexity or other criteria.

Figure 6:
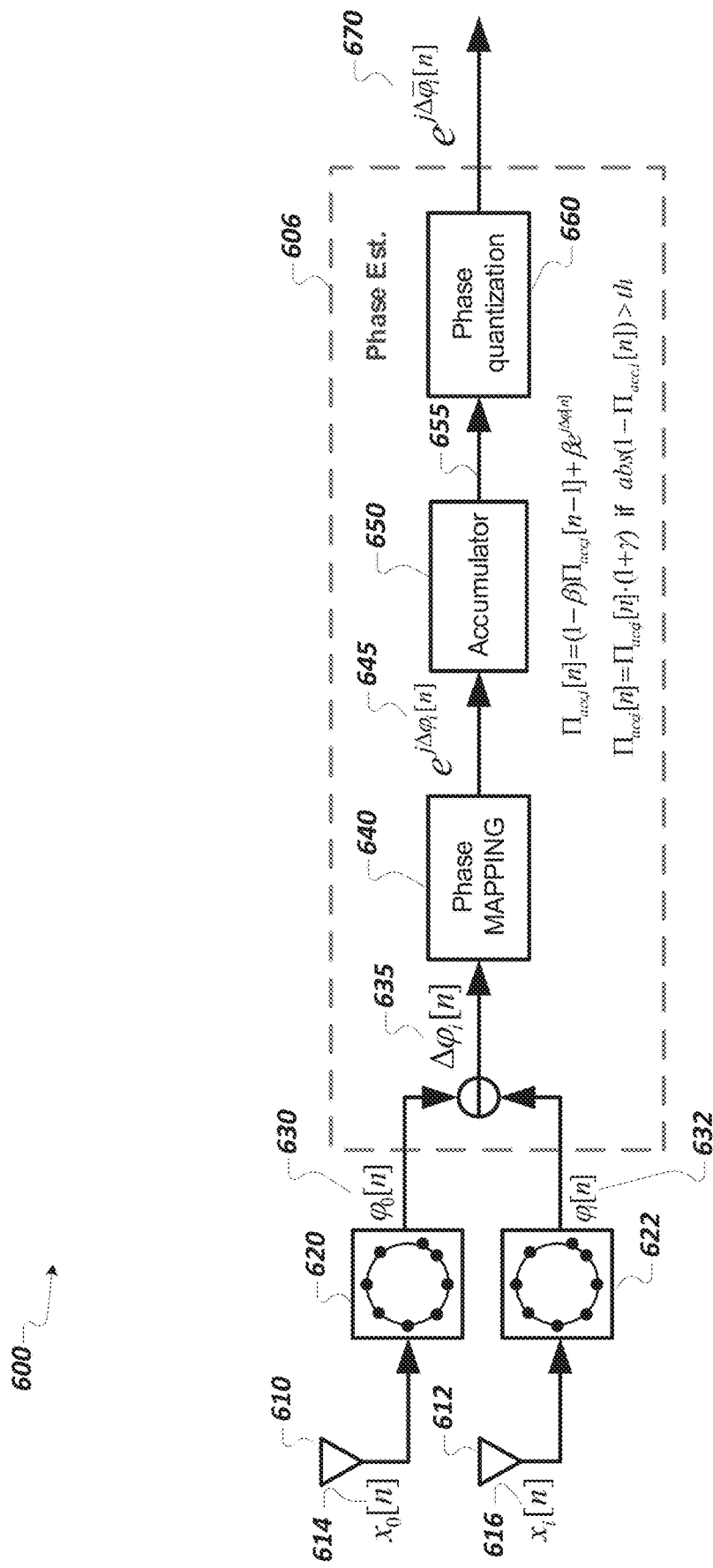
FIG. 6 is a diagram of a receiving device that includes an example of a phase estimator for coherent phase estimation based on a phase average approach.

FIG. 6 is a diagram of a receiving device 600 that includes an example of a phase estimator 606 for coherent phase estimation based on a phase average approach. Besides the phase estimator 606, the device 600 includes, among other things, a pair of antennas 610 and 612 and a pair of quantizers 620 and 622. The device 600 receives two signals $x_0$ [n] 614 and $x_i$[n] 616 from the two antennas 610 and 612, respectively. The signals $x_0$ [n] 614 and $x_1$ [n] 616 can be the STF sequences that include multiple repetitions of a known reference sequence that have gone through respective wireless channels via the respective two antennas 610 and 612. In some implementations, the signals $x_0$ [n] 614 and $x_i$ [n] 616 can represent ADC samples of the received signal streams.

The quantizers 620 and 622 quantize the angles of the signals $x_0$ [n] 614 and $x_i$ [n] 616 and output the quantized angles $\varphi_0$ [n] 630 and $\varphi_i$[n] 632, respectively. The quantizers 620 and 622 can quantize the angles, for example, according to a PSK constellation or another mapping. The granularity of the quantization can be determined based on, for example, a desired estimation accuracy, response time requirement, computational complexity or other criteria.

In some implementations, the phase estimation can be performed by estimating a phase difference between the two received signals $x_0$ [n] 614 and $x_i$ [n] 616. For example, the signal $x_0$ [n] 614 can be regarded as a reference received signal. The phase estimator 606 receives the quantized angles $\varphi_0$ [n] 630 and $\varphi_i$[n] 632 and derives an angle difference $\Delta\varphi_i[n]$ 635 of the received signal $x_i$ [n] 616 relative to the reference received signal $x_0$ [n] 614, where $\Delta\varphi_i[n] = \varphi_i[n] - \varphi_0$ [n]. After estimation, the phase estimator 606 outputs an estimated phase difference $e^{j\Delta\overline{\varphi}[n]}$ 670, which is used for combining the signals $x_0$ [n] 614 and $x_i$ [n] 616 with coherent phases, for example, according to Equation (9).

The phase estimator 606 performs coherent combining phase estimation based on a phase average approach. In some implementations, the phase estimator 606 includes a phase mapper 640, an accumulator 650, and a phase quantizer 660. The phase mapper 640 obtains a corresponding phase difference $e^{j\Delta\varphi_i[n]}$ 645 based on the angle difference $\Delta\varphi_i[n]$ 635 according to a mapping rule. In some implementations, the phase mapper 640 can be, for example, a PSK mapper that maps an input angle (e.g., the angle difference $\Delta\varphi_i[n]$ 635) to a phase of a PSK point according to a PSK constellation:

$$e^{j\Delta\varphi_i[n]} = PSK\_MAPPING[\varphi_0[n] - \varphi_i[n]] \quad (16),$$

The phase of the PSK point is output as the corresponding phase difference $e^{j\Delta\varphi_i[n]}$ 645 based on the angle difference $\Delta\varphi_i[n]$ 635. In other words, the angle difference $\Delta\varphi_i[n] = [\varphi_0[n] - \varphi_i[n]]$ is moduloed according to the phase of the PSK point [0, PSK_Points−1]. For example, if 8PSK is used, the number of PSK points is 8, then the range of the PSK point index is [0, 7]. So the modulo operation will bring the phase value into this range.

The accumulator 650 accumulates and averages the phase difference $e^{j\Delta\varphi_i[n]}$ 645 over time (e.g., across the sample index n). For example, the accumulator 650 performs a one-pole filter averaging of the angle difference according to Equation (17):

$$\Pi_{acc,i}[n]=(1-\beta)\Pi_{acc,i}[n-1]+\beta \cdot e^{j\Delta\varphi_i[n]} \quad (17),$$

where $\Pi_{acc,i}[n]$ 655 represents the accumulated phase average for antenna i at the time instance n. In other words, $\Pi_{acc,i}[n]$ 655 represents the time-domain phase average of the phase difference for antenna i at the time instance n.

In some implementations, if the amplitude of $\Pi_{acc,i}[n]$ 655 is below a threshold, the amplitude of $\Pi_{acc,i}[n]$ 655 can be scaled back. For example, $$\Pi_{acc,i}[n]=\Pi_{acc,i}[n] \cdot (1+\gamma), \text{ if } |1-\Pi_{acc,i}[n]|>\text{threshold} \quad (18).$$

As an example, threshold=1/52, $\gamma$=1/16.

The phase quantizer 660 then quantizes the phase average $\Pi_{acc,i}[n]$ 655 according to a quantization criterion, such as a PSK constellation (e.g., 16-PSK constellation):

$$e^{j\overline{\Delta\varphi}[n]}=PSK\_Quantize(\Pi_{acc,i}[n]) \quad (19).$$

The resulting phase estimate $e^{\overline{\Delta\varphi}[n]}$ 670 is output for MACC with coherent combining phase for CS/ST.

Note that FIGS. 5 and 6 each show an example phase estimator (estimator 505 or 606) for estimating a phase difference between a signal received from a reference antenna and another signal received from another antenna. In some implementations, for a receiver with $N_R$ receiving antennas, $N_R \geq 2$, each of the rest $N_R-1$ receiving antennas can be coupled with a respective phase estimator for detecting a phase difference between the signal received from the antenna relative to the signal received from the reference antenna.

Figure 7:
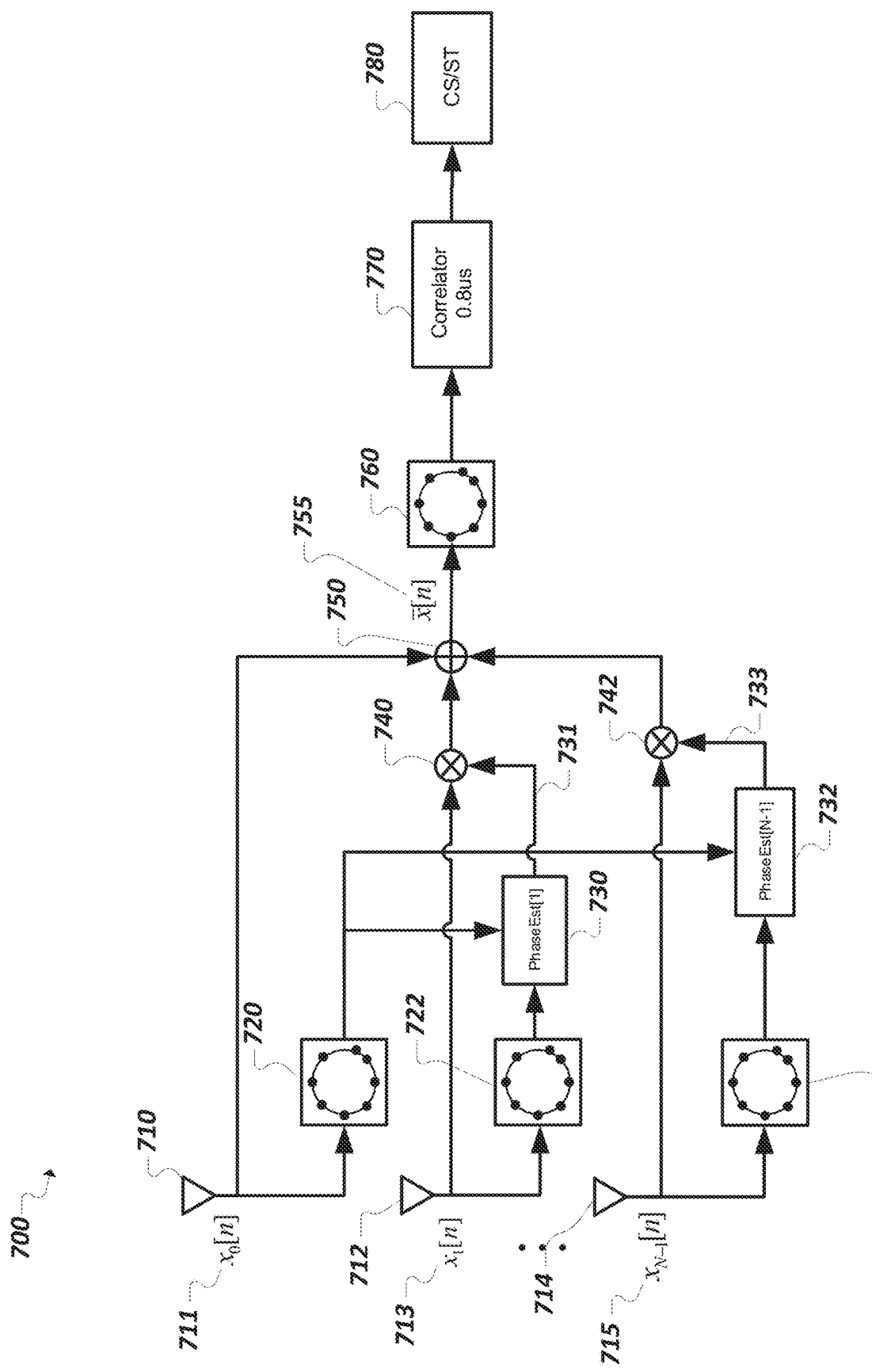
FIG. 7 is a diagram of a receiving device for performing coherent phase estimation for MACC CS/ST.

FIG. 7 is a diagram of a receiving device 700 for performing coherent phase estimation for MACC CS/ST. The receiving device 700 includes N receiving antennas 710, 712, 714, etc. The device 700 receives N signals $x_0$ [n] 711, $x_1$ [n] 713, . . . , and $x_{N-1}$ [n] 715 from the N antennas 710, 712, 714, etc., respectively. In some implementations, each of the N signals $x_0$ [n] 711, $x_1$ [n] 713, . . . , and $x_{N-1}$ [n] 715 goes through a respective phase or angle quantizer (e.g., quantizer 720, 722, 724, etc.) and is then fed into a phase estimator (e.g., phase estimator 730, 732, etc.).

As shown in the receiving device 700, the antenna 0 710 is regarded as the reference antenna. As such, each of the rest N−1 signals received from the rest N−1 antennas can be compared with the signal $x_0$ [n] 711 received from the reference antenna 710 and fed into a respective phase estimator (e.g., phase estimator 730, 732, etc.) for determining a phase difference between the signal received from the antenna relative to the reference received signal $x_0$ [n] 711. The phase estimator 730, 732, etc. can be implemented as the phase estimator 505 based on an angle average approach or phase estimator 606 based on a phase average approach. Then, the estimated phase difference (e.g., phase difference 731, 733, etc.) output from the phase estimator (e.g., phase estimator 730, 732, etc.) is multiplied with the corresponding received signal (e.g., $x_1$ [n] 713, $x_{N-1}$ [n] 715) by a respective multiplier (e.g., multiplier 740, 742, etc.). Then the N−1 phase-adjusted signals are combined with the reference received signal $x_0$ [n] 711 by an adder 750, for example, similar to the Equation (9), resulting a combined signal $\bar{x}$ [n] 755 with estimated coherent phase. The combined signal $\bar{x}$ [n] 755 can go through a correlation path that includes a quantizer 760, a correlator 770, and a CS/ST processing unit 780 for CS/ST. The correlation path can be implemented in a similar manner as the correlation path 400 shown in FIG. 4.

The hardware cost for a receiver with N receiving antennas includes (N−1) accumulators and (N−1) phase multipliers (e.g., the multipliers 740, 742, etc. in FIG. 7), and one correlation path (e.g., the correlation path 700 shown in FIG. 7). In some implementations, the phase multiplier can be based on quantized phases so that its design can be simplified. The latency of the techniques and systems described with respect to FIGS. 5-7 can be shorter than legacy systems and techniques. In some instances, the latency of the techniques described here is about 3~5 clock cycles.

Figure 8:
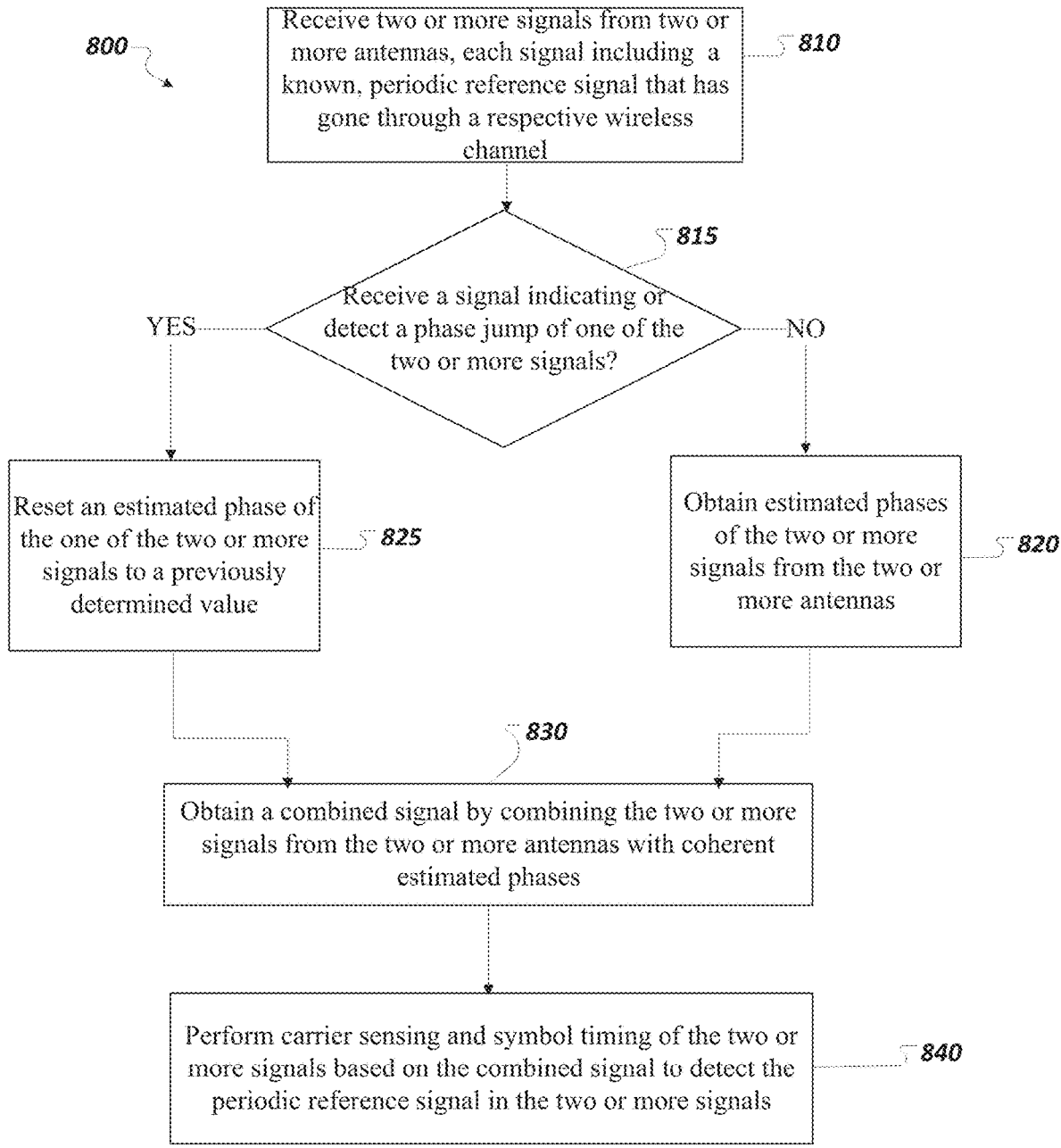
FIG. 8 is a flowchart showing a process of MACC for CS/ST in a multi-antenna communication system.

FIG. 8 is a flowchart showing a process 800 of MACC for CS/ST in a multi-antenna communication system (e.g., a WLAN system that supports MIMO). The process 800 can be performed by a receiving device in the multi-antenna communication system. The receiving device can be a wireless communication device such as the access point 14 or a client station 25 in the system 10, the receiving device 300, 500, 600, or another device. The receiving device includes receiver and processor electronics for performing the process 800. In some implementations, the processor electronics include a processor programmed with computer-readable instructions that, when run, cause the receiving device to perform some or all operations of the process 800.

At 810, two or more signals are received from two or more antennas of the receiving device. Each of the two or more signals includes a known, periodic reference signal that has gone through a respective wireless channel via one of the two or more antennas. In some implementations, the known, periodic reference signal is transmitted as a short training field (STF) sequence in a beginning part of a preamble for WLAN communication. For example, the known, periodic reference signal is the 0.8 us sequence transmitted in the STF of an OFDM packet according to IEEE 802.11n or 802.11ac protocol. The two or more received signals can be, for example, the two signals $x_0$ [n] 305 and $x_i$ [n] 315 received from the two antennas 310 and 312 of FIG. 3, the two signals $x_0$ [n] 514 and $x_1$ [n] 516 from the two antennas 510 and 512 signals of FIG. 5, or the two signals $x_0$ [n] 614 and $x_i$ [n] 616 from the two antennas 610 and 612 of FIG. 6.

In practical systems, the signal phase on each antenna may vary before AGC settles, due to analogue constraints. To account for the potential sudden phase changes during an STF period, the combining phase estimator can be reset when the phase jump happens. In some implementations, the receiver may include hardware configured to detect the phase jump and send a signal indicating the phase jump. In some other implementations, the processor electronics can be coupled with programmed instructions for detecting the phase jump.

At 815, whether receiving a signal indicating a phase jump of one of the two or more signals is received or whether a phase jump of one of the two or more signals is detected (e.g., by the processor electronics) is determined. For example, the signal indicating the phase jump can be fed in from another automatic gain control (AGC) block. In some implementations, the phase jump can be detected by calculating the phase difference between adjacent ADC samples and comparing with a phase jump threshold to decide whether there is a phase jump.

Accordingly, in response to receiving the signal indicating a phase jump of one of the two or more signals or detecting a phase jump of one of the two or more signals, at 825, an estimated phase of the one of the two or more signals is reset to a previously determined value. For example, the previously determined value can be a default value or a phase of the one of the two or more signals determined at a previous time instance.

If no such signal indicating a phase jump of one of the two or more signals is received, nor a phase jump of one of the two or more signals is detected, at 820, estimated phases of the two or more signals from the two or more antennas are obtained. Several techniques can be used for obtaining the estimated phases of the two or more signals for coherent phase combination.

As a first example, an STF cross-correlation method can be performed according to the techniques described with respect to Equations (1)-(7). For example, for each of the two or more signals from the two or more antennas, a cross-correlation of the signal from the antenna with the known, periodic reference signal is performed. Based on the cross-correlation the wireless channel for the signal from the antenna is estimated. In some implementations, a time-domain average of the cross-correlation is obtained, for example, over one or more periods of the reference signal (e.g., a period of 0.8 us of the periodic sequence used in STF) to improve the estimation accuracy. Accordingly, estimating the wireless channel based on the cross-correlation includes estimating the wireless channel based on the time-domain average of the cross-correlation.

In some implementations, both a delay offset and a phase difference are estimated based on the estimated wireless channel for each of the two or more signals from the two or more antennas. For example, the delay offset and the phase difference are estimated according to the techniques described with respect to Equations (4) and (5), respectively. Accordingly, combining the two or more signals from the two or more antennas with coherent phases based on the estimated phases of the two or more signals from the two or more antennas includes combining the two or more signals from the two or more antennas with coherent phases according to both the phase difference and the delay offset, for example, according to the techniques described with respect to Equation (3).

In some implementations, only a phase difference but no delay offset is estimated based on the estimated wireless channel for each of the two or more signals from the two or more antennas. The phase difference can be estimated, for example, according to the techniques described with respect to Equation (7). Accordingly, combining the two or more signals from the two or more antennas with coherent phases based on the estimated phases of the two or more signals from the two or more antennas includes combining the two or more signals from the two or more antennas with coherent phases according to the phase difference, for example, according to the techniques described with respect to Equation (6).

In some implementations, as another example, an inter-antenna cross-correlation method can be performed according to the techniques described with respect to Equations (8) and (9). For example, a reference received signal is selected or otherwise identified from the two or more signals from the two or more antennas. For each of the two or more signals from the two or more antennas, other than the reference received signal, a cross-correlation of the signal with the reference received signal is performed. Based on the cross-correlation, a phase difference between the signal and the reference received signal is estimated. In some implementations, the phase difference between the signal and the reference received signal is estimated based on a quantized angle of analog to digital converter (ADC) samples of the signal.

In some implementations, the phase difference between the signal and the reference received signal is estimated according to an angle average approach. For example, for each of the two or more signals, other than the reference received signal, a time-domain average of the angle difference between the signal and the reference received signal is obtained. In some implementations, the angle difference is computed based on the quantized angle of ADC samples of the signal. In some other implementations, the angle difference is computed based on the un-quantized angle of ADC samples of the signal. In some implementations, the time-domain average of the angle difference is performed by an accumulator, for example, the accumulator 550 according to techniques described with respect to FIG. 5. In some implementations, the time-domain angle average of the angle difference is obtained by using a low-pass filter, such as a one-pole filter or a windowed filter according to Equations (10) and (11), respectively, or another averaging method.

A rounded time-domain average of the angle difference is obtained by performing an angle rounding of the time-domain average of the angle difference. In some implementations, the angle rounding is performed by an angle rounder, for example, the angle rounder 560 according to the systems and techniques described with respect to FIG. 5.

Then, a phase mapping (e.g., a PSK mapping) of the rounded time-domain average of the angle difference is performed, for example, by a phase mapper (e.g., a PSK mapper), for example, the phase mapper 570 according to the systems and techniques described with respect to FIG. 5. The resulting mapped rounded time-domain average of the angle difference can be used as the estimated phase difference between the signal and the reference received signal.

In some implementations, the phase difference between the signal and the reference received signal is estimated according to a phase average approach. For example, for each of the two or more signals, a corresponding phase difference of an angle difference between the signal and the reference received signal is obtained by phase mapping. In some implementations, the phase mapping is performed by a phase mapper (e.g., a PSK mapper), for example, the phase mapper 640 according to the techniques described with respect to FIG. 6.

A time-domain phase average of the corresponding phase difference is obtained. In some implementations, the time-domain phase average of the corresponding phase difference is performed by an accumulator, for example, the accumulator 650 according to the systems and techniques described with respect to FIG. 6. In some implementations, the time-domain phase average of the phase difference is obtained by using a low-pass filter, such as a one-pole filter or a windowed filter, for example, according to Equations (12) and (13), respectively, or another averaging method. In some implementations, in response to determining that the amplitude of the time-domain phase average of the corresponding phase difference is below a threshold, an amplitude of the time-domain phase average of the corresponding phase difference can be scaled back, for example, according to the techniques described with respect to Equation (18).

A quantized time-domain phase average of the corresponding phase difference is obtained. In some implementations, the quantized time-domain phase average is obtained by a phase quantizer, for example, the phase quantizer 660 according to the systems and techniques described with respect to FIG. 6. The quantized time-domain phase average of the corresponding phase difference can be regarded as the estimated phase difference between the signal and the reference received signal and used for coherent phase combination of the two or more signals from the two or more antennas.

At 830, a combined signal is obtained by combining the two or more signals from the two or more antennas with coherent estimated phases of the two or more signals from two or more antennas. Depending on the phase estimation approach, the combined signal can be obtained, for example, according to the techniques described with respect to Equation (3), (6) or (9).

At 840, carrier sensing (CS) and symbol timing (ST) of the two or more signals from the two or more antennas are performed based on the combined signal to detect the periodic reference signal in the two or more signals received by the receiver. In some implementations, the combined signal can be regarded as a single-antenna signal and the CS/ST techniques designed for a single-antenna system can be applied. For example, the CS/ST is performed according to the systems and techniques described with respect to FIG. 4 based on the combined signal.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including, potentially, a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification, in the context of separate embodiments, can also be implemented in combination, in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A device including:
a receiver configured to receive two or more signals from two or more antennas, each of the two or more signals including a known, periodic reference signal that has gone through a respective wireless channel via one of the two or more antennas;
processor electronics configured to:
obtain estimated phases of the two or more signals from the two or more antennas;
obtain a combined signal by combining a first signal of the two or more signals with a first coherent estimated phase of the first signal and combining a second signal of the two or more signals with a second coherent estimated phase of the second signal; and
perform carrier sensing and symbol timing of the two or more signals from the two or more antennas based on the combined signal to detect the periodic reference signal in the two or more signals received by the receiver.

2. The device of claim 1, wherein the known, periodic reference signal is transmitted as a short training field (STF) sequence in a beginning part of a preamble for wireless local area network (WLAN) communication.

3. The device of claim 1, wherein the processor electronics comprise a processor programmed with computer-readable instructions that, when run, cause the device to, for each of the two or more signals from the two or more antennas,
perform a cross-correlation of the signal from the antenna with the known, periodic reference signal; and
estimate, based on the cross-correlation, the wireless channel for the signal from the antenna.

4. The device of claim 3, wherein the computer-readable instructions, when run, cause the device to obtain a time-domain average of the cross-correlation, and wherein estimating the wireless channel based on the cross-correlation comprises estimating the wireless channel based on the time-domain average of the cross-correlation.

5. The device of claim 3, wherein the computer-readable instructions, when run, cause the device to:

estimate both a phase difference and a delay offset based on the estimated wireless channel for the each of the two or more signals from the two or more antennas; and wherein combining the first signal and the second signal of the two or more signals with the first and second coherent estimated phases comprises combining the first signal and the second signal of the two or more signals with the first and second coherent estimated phases according to both the phase difference and the delay offset.

6. The device of claim 3, wherein the computer-readable instructions, when run, cause the device to:

estimate phase differences based on the estimated wireless channel for the each of the two or more signals from the two or more antennas; and wherein combining the first signal and the second signal of the two or more signals with the first and second coherent estimated phases comprises combining the first signal and the second signal of the two or more signals with the first and second coherent estimated phases according to the phase differences.

7. The device of claim 1, wherein the processor electronics comprise a processor programmed with computer-readable Instructions that, when run, cause the device to identify a reference received signal from the two or more signals from the two or more antennas; and for each of the two or more signals from the two or more antennas, other than the reference received signal, perform a cross-correlation of the signal with the reference received signal; and estimate, based on the cross-correlation, a phase difference between the signal and the reference received signal.

8. The device of claim 7, wherein the computer-readable instructions, when run, cause the device to estimate the phase difference between the signal and the reference received signal based on a quantized angle of analog to digital converter (ADC) samples of the signal.

9. The device of claim 7, wherein the computer-readable instructions, when run, cause the device to, for the each of the two or more signals, other than the reference received signal, obtain a time-domain angle average of an angle difference between the signal and the reference received signal;

obtain a rounded time-domain average of the angle difference by performing an angle rounding of the time-domain angle average of the angle difference; and perform a phase mapping of the rounded time-domain angle average of the angle difference, wherein the phase difference between the signal and the reference received signal is estimated based on the phase mapping of the rounded time-domain angle average of the angle difference.

10. The device of claim 9, wherein the time-domain angle average of the angle difference is obtained by using a low-pass filter.

11. The device of claim 7, wherein the computer-readable instructions, when run, cause the device to, for the each of the two or more signals, other than the reference received signal, obtain a corresponding phase difference of an angle difference between the signal and the reference received signal by a phase mapping;

obtain a time-domain phase average of the corresponding phase difference; and obtain a quantized time-domain phase average of the corresponding phase difference, wherein the phase difference between the signal and the reference received signal is estimated based on the quantized time-domain phase average of the corresponding phase difference.

12. The device of claim 11, wherein the time-domain phase average of the corresponding phase difference is obtained by using a low-pass filter.

13. The device of claim 11, wherein the computer-readable instructions, when run, cause the device to scale an amplitude of the time-domain phase average of the corresponding phase difference when the amplitude of the time-domain phase average of the corresponding phase difference is below a threshold.

14. The device of claim 1, wherein the processor electronics are configured to, in response to receiving a signal indicating a phase jump of one of the two or more signals or detecting a phase jump of one of the two or more signals, reset an estimated phase of the one of the two or more signals to a previously determined value.

15. A method comprising:

receiving, by a receiving device, two or more signals from two or more antennas, each of the two or more signals including a known, periodic reference signal that has gone through a respective wireless channel via one of the two or more antennas;

obtaining, by the receiving device, estimated phases of the two or more signals from the two or more antennas;

obtaining, by the receiving device, a combined signal by combining a first signal of the two or more signals with a first coherent estimated phase of the first signal and combining a second signal of the two or more signals with a second coherent estimated phase of the second signal; and performing, by the receiving device, carrier sensing and symbol timing of the two or more signals from the two or more antennas based on the combined signal to detect the periodic reference signal in the two or more signals received by the receiving device.

16. The method of claim 15, wherein obtaining estimated phases of the two or more signals from the two or more antennas comprises:

for each of the two or more signals from the two or more antennas, performing a cross-correlation of the signal from the antenna with the known, periodic reference signal; and estimating, based on the cross-correlation, the wireless channel for the signal from the antenna.

17. The method of claim 15, wherein obtaining estimated phases of the two or more signals from the two or more antennas comprises:

identifying a reference received signal from the two or more signals from the two or more antennas;

for each of the two or more signals from the two or more antennas, other than the reference received signal, performing a cross-correlation of the signal with the reference received signal; and estimating, based on the cross-correlation, a phase difference between the signal and the reference received signal.

18. A non-transitory computer-readable medium embodying a program operable to cause a receiving device to perform operations comprising:

receiving two or more signals from two or more antennas, each of the two or more signals including a known, periodic reference signal that has gone through a respective wireless channel via one of the two or more antennas;

obtaining estimated phases of the two or more signals from the two or more antennas;

obtaining a combined signal by combining a first signal of the two or more signals with a first coherent estimated phase of the first signal and combining a second signal of the two or more signals with a second coherent estimated phase of the second signal; and performing carrier sensing and symbol timing of the two or more signals from the two or more antennas based on the combined signal to detect the periodic reference signal in the two or more signals received by the receiving device.

19. The medium of claim 18, wherein the obtaining estimated phases of the two or more signals from the two or more antennas comprises:

for each of the two or more signals from the two or more antennas, performing a cross-correlation of the signal from the antenna with the known, periodic reference signal; and estimating, based on the cross-correlation, the wireless channel for the signal from the antenna.

20. The medium of claim 18, wherein the obtaining estimated phases of the two or more signals from the two or more antennas comprises:

identifying a reference received signal from the two or more signals from the two or more antennas;

for each of the two or more signals from the two or more antennas, other than the reference received signal, performing a cross-correlation of the signal with the reference received signal; and estimating, based on the cross-correlation, a phase difference between the signal and the reference received signal.

\* \* \* \* \*